United States Patent [19]

Bryzzhev et al.

[11] 4,074,576
[45] Feb. 21, 1978

[54] FLUID PRESSURE MEASURING DEVICE

[76] Inventors: Lev Dmitrievich Bryzzhev, ulitsa Artema, 20/22, kv. 21; Viktor Semenovich Kupko, prospekt Traktorostroitelei, 160, kv. 270, both of Kharkov, U.S.S.R.

[21] Appl. No.: 599,852
[22] Filed: July 28, 1975
[51] Int. Cl.² ............................................. G01L 9/12
[52] U.S. Cl. ................................................ 73/702
[58] Field of Search ........... 73/398 R, 398 C, DIG. 1, 73/406, 384

[56] References Cited

U.S. PATENT DOCUMENTS

| | | | |
|---|---|---|---|
| 3,399,572 | 9/1968 | Riordan et al. | 73/398 C |
| 3,863,505 | 2/1975 | Moffatt | 73/398 R |

*Primary Examiner*—Donald O. Woodiel
*Attorney, Agent, or Firm*—Lackenbach, Lilling & Siegel

[57] ABSTRACT

A fluid pressure transducer comprising a resilient member located in a housing and made in the form of a sleeve whose open end receives a fluid, the pressure of which is to be is measured. Said resilient member accommodates a vibrating member secured, on two supports, parallel to the longitudinal axis of said resilient member, said vibrating member being made to oscillate by means of an exciter. The frequency variation of the vibrating member oscillations when the pressure of the supplied fluid acts upon the resilient member is used to measure said pressure. The fluid pressure transducer is compact and convenient in operation.

11 Claims, 3 Drawing Figures

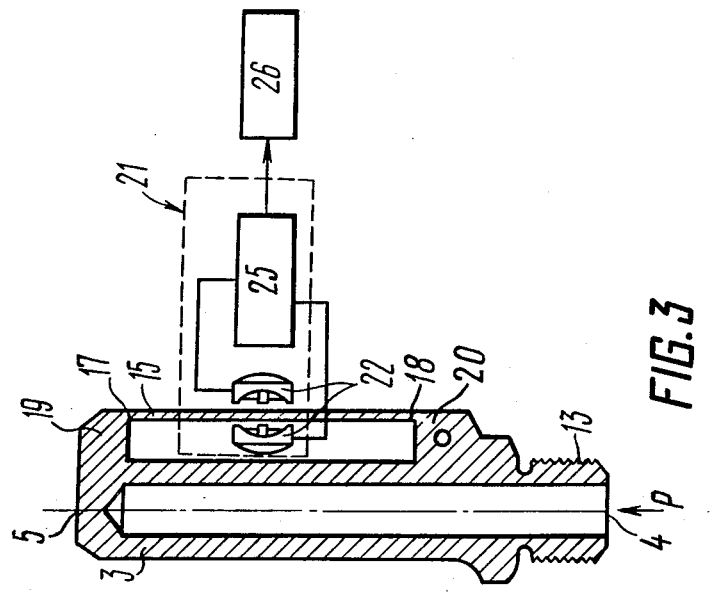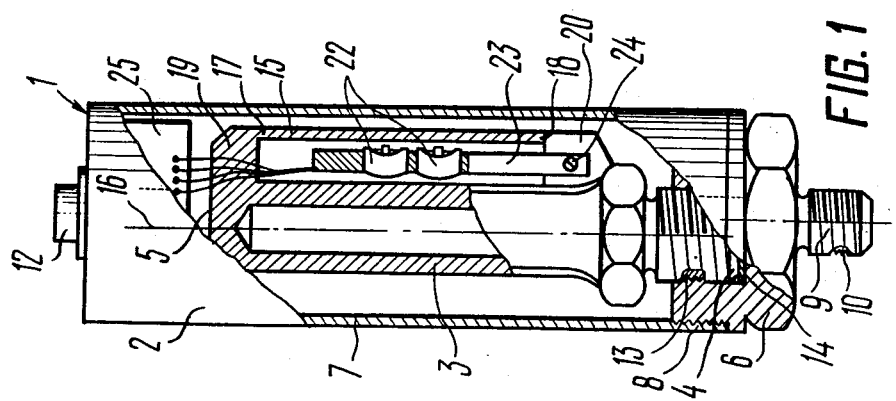

FLUID PRESSURE MEASURING DEVICE

The present invention relates to pressure measuring devices and more particularly to a fluid pressure transducer used substantially for measuring pressure in oil and gas wells, as well as in pipelines and chemical reactors.

The fluid pressure transducer can be advantageously used downhole, remote from control apparatus, for investigating deep exploratory and producing wells, for prospecting and exploring producing gas, condensed gas and oil formations as well as for measuring pressure in large industrial water inlets and pipelines.

The prior art fluid pressure gauges are move often than not limited in their accuracy of measurement. However, progress in science and technology necessitates the use of specially designed high accuracy gauges in many applications. These pressure gauges will speed up investigations, enhance the quality of the manufactured products and improve production processes. For example, accurate measurements of the pressure in oil and gas wells permit a more accurate evaluation of the thickness of a production seam and its location, facilitate the process of investigation and shorten the well completion period.

Known in the art is a device for measuring pressure of gases and liquids comprising a resilient member made in the form of a coiled tube (Bourdon tube), one end of which is secured in the transducer housing and the other end of which is coupled to an indicator.

When measuring pressure, liquid or gas is fed into the coiled tube, and the latter is uncoiled. The indicator registers the amount of uncoiling, which is proportional to the pressure being measured. Disadvantages inherent in said device are its bulkiness, time and temperature instability and low accuracy.

Also known in the art is a pressure transducer comprising a resilient member made in the form of a hollow cylinder, one end of which is secured in the transducer housing, while the other end is introduced into an electromagnetic system for exciting oscillations.

The fluid supplied into the cavity of the resilient member changes the frequency of its oscillations by a value proportional to the pressure being measured. This transducer converts a non-electric value being measured into an electric signal, possesses a higher resolution power as compared with the known sensors, and permits transmission of the information signal at a distance. Said transducer requires a housing base substantially heavier than the resilient member and is not efficient since it consumes much electric power. Due to said heaviness, the natural oscillation frequency of the resilient member is so low, that it results in serious errors in measurement.

Another known fluid pressure transducer comprises a housing accommodating a resilient member and a vibrating member in the form of a strip, whose end faces are coupled through two supports to the resilient member and whose oscillations are excited by an exciter located in the housing, the oscillation frequency, varying due to the effect of the liquid or gas pressure upon the resilient member, being representative of said pressure.

In said known transducer, the resilient member is made in the form of a membrane on which the vibrating member in the form of a rectangular strip is secured by means of two supports. The vibrating member is perpendicular to the axis of the transducer. The transducer housing also accommodates an exciter for generating oscillations of the vibrating member, said exciter comprising two electromagnetic coils and an amplifier. The liquid or gas whose pressure is measured is supplied into the space under the membrane, thus deflecting the membrane. In this case, the supports on the membrane come apart and the tension force produced in the strip causes a variation in its oscillation frequency. The frequency variation of the vibrating member oscillations is used to measure the pressure. The measurement range of the known transducer depends upon the thickness of the resilient member wall, i.e. the thickness of the membrane.

The intricate pattern of the membrane deformation causes hysteresis phenomena, thus reducing its accuracy.

The strip perpendicular to the transducer axis increases the cross-sectional area of the transducer, thereby rendering it impractical for measuring pressure in gas and oil wells.

It is an object of the present invention to provide a fluid pressure transducer featuring high accuracy and stability in measurements of liquid or gas pressure.

Another object of the present invention is to reduce the transverse dimension of the transducer in order to permit measurement of pressures in narrow, deep wells.

These objects are attained by a transducer for measuring liquid and gas pressure, comprising a housing accommodating a resilient member and a vibrating member in the form of a strip, whose end faces are coupled through two supports to the resilient member, said vibrating member being made to oscillate by an exciter located in the transducer housing and the frequency of said oscillations varying under the effect of the fluid pressure upon the resilient member by a value proportional to said pressure, said resilient member being made in the form of a sleeve whose open end receives gas or liquid, while the vibrating member is located on the side surface of the resilient member parallel to its longitudinal axis and the frequency variation of its oscillations is proportional to the value of the liquid or gas pressure being measured.

The embodiment of the fluid pressure transducer according to the present invention, i.e. the resilient member being made in the form of a sleeve and the vibrating member being parallel to the resilient member, increases the accuracy and stability of pressure measurements by 50%, as compared with any known transducer, as well as permitting expansion of the range of measured pressures. The small transverse dimension of the fluid pressure transducer of this invention permits measurement of fluid pressure in narrow deep wells.

Additional features and advantages of the present invention will become more apparent from the following detailed description of a preferred embodiment thereof with reference to the accompanying drawings, wherein:

FIG. 1 is a elevational view partially in section and partially broken away of a fluid pressure transducer;

Figure 2:
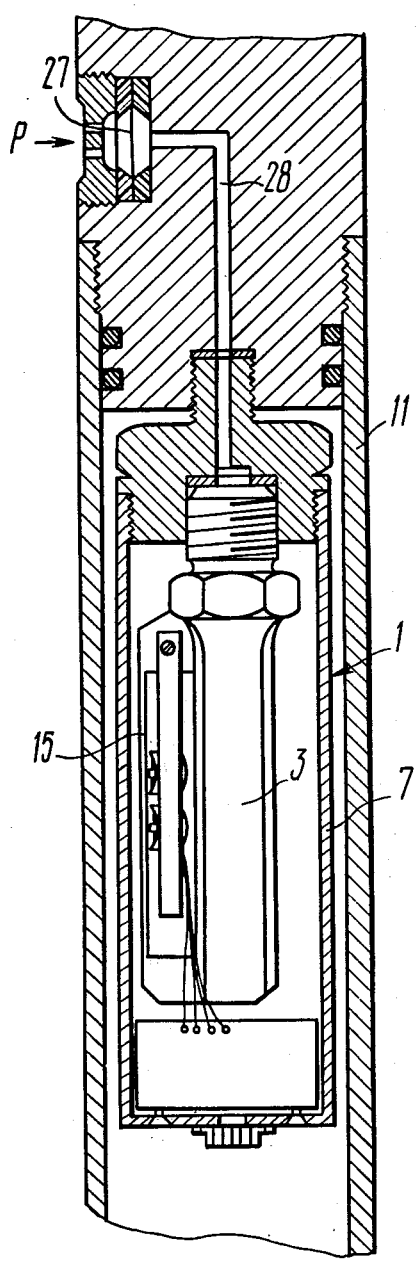
FIG. 2 is a longitudinal section view of a fluid pressure transducer in an operating position in a device for investigating wells; and, FIG. 3 is a schematic view of an exciter for inducing oscillations in a vibrating member.

According to the invention, a fluid pressure transducer 1 (FIG. 1) comprises a housing 2 accommodating a resilient member 3 made in the form of a sleeve. The fluid whose pressure is measured is supplied through an open end 4 of the resilient member 3, while the other end face 5 thereof is closed. The housing 2 is detachable and comprises a base 6 and a casing 7 secured on the base 6 by means of a thread 8.

The base 6 of the housing 2 is provided with a union 9 having a thread 10 for mounting the transducer in a device 11 (FIG. 2) for investigating wells. The cover casing 7 of the housing 2 is provided with a connector 12 (FIG. 1) for connection to a power supply and for extraction of the electric signal. The resilient member 3 is fastened to the base 6 in the housing 2 of the transducer 1 by a thread 13 and sealed therewith by a gasket 14 which is in contact with the open end face 4 of the resilient member 3.

A vibrating member 15 made in the form of a strip is located on one of the side surfaces of the resilient member 3 and is parallel to the longitudinal axis 16 thereof. The end faces 17 and 18 of the vibrating member 15 are coupled to the resilient member 3 by two supports 19 and 20, respectively. In the described embodiment of the present invention, the sleeve 3, supports 19, 20 and vibrating member 15 are made as a whole unit.

An exciter 21 (FIG. 3), for inducing oscillations in the vibrating member 15 in the described embodiment of the present invention, comprises two electromagnetic coils 22 arranged on a frame 23 (FIG. 1) secured on the support 20 by a screw 24. The vibrating member 15 is in a variable electromagnetic field of the coils 22 connected to the input and output of the amplifier 25 supplied from a constant voltage source (not shown), the output being electrically associated via the connector 12 to a recorder 26 (FIG. 3).

The fluid whose pressure is measured is fed to the transducer 1 (FIG. 2), in the described embodiment of the present invention, through a separating membrane 27, along a passage 28 filled with oil and into the inner cavity of the resilient member 3.

The fluid pressure transducer operates as follows.

When pressure $p$ is not applied, the oscillations of the vibrating member 15 (FIG. 1), induced by the exciter 21, are determined by the geometric and physical parameters of the vibrating member 15 at the initial frequency of oscillation which appears at the moment when the constant voltage is introduced into the amplifier. When pressure $p$ is applied to the cavity of the resilient member 3 of the transducer 1, the resilient member 3 is deformed in such a way that the tension force produced in the vibrating member 15, arranged on the supports 19, 20 (FIG. 1) on the resilient member 3 in parallel to its longitudinal axis 16, changes the frequency of the vibrating member oscillations by a value proportional to the measured quantity.

The frequency signal from the transducer 1 is fed to the recorder 26 (FIG. 3) which is a frequency meter.

To record the signal supplied from the transducer 1 and to convert it into a value to be measured, the frequency signal from the transducer 1 is fed to one input of the oscillation exciter 21 and another input thereof is fed with a reference frequency equal to the initial frequency of the transducer. The exciter 21, therefore, includes means, either the coils 22 or the amplifier 25, for generating a difference frequency taken off from the oscillation exciter is proportional to the pressure to be measured and is indicated by a meter (not shown), which indicates the pressure in units of measurement.

This fluid pressure transducer features high accuracy and stability in measurement and a small diameter which permits its use in deep, narrow wells. The wide range of measurement and the waveform of the output signal make it possible to use said transducer for checking high pressure pipelines.

What is claimed is:

1. A fluid pressure transducer comprising: a housing; a resilient member located in said housing and made in the form of a sleeve whose open end receives a fluid the pressure of which is to be measured; a vibrating member in the form of a strip and having end faces, said vibrating member being located on a side surface of said resilient member and being parallel to its axis; two supports for securing the end faces of the vibrating member to said resilient members; an exciter located in said housing and intended to induce oscillations in said vibrating member, said exciter including means for generating a signal having a frequency which varies under the effect of the fluid pressure upon said resilient member by a value proportional to the variation in the vibrating member oscillation frequency.

2. A fluid pressure measuring device according to claim 1, wherein the housing includes a base, a casing, and means for attaching said base to said casing.

3. A fluid pressure measuring device according to claim 2, wherein the means for attaching said base to said casing is a threaded connection.

4. A fluid pressure measuring device according to claim 2, wherein the base includes a union and means for mounting said transducer on an external device.

5. A fluid pressure measuring device according to claim 4, wherein the means for mounting is a threaded connection at one end of said union.

6. A fluid pressure measuring device according to claim 2, wherein the casing includes a connector for connection of a power supply to the transducer and for extracting of an electric signal.

7. A fluid pressure measuring device according to claim 2, wherein the resilient member is fastened to the base by means of a thread and sealed therewith by means of a gasket.

8. A fluid pressure measuring device according to claim 1, wherein the resilient member, the supports and the vibrating member are made as a single, unitary unit.

9. A fluid pressure measuring device according to claim 1, wherein the exciter includes two electromagnetic coils, a frame on which said coils are arranged, and means for securing said frame on one of said supports.

10. A fluid pressure measuring device according to claim 9, further including an amplifier, whose inputs and outputs are connected to said electromagnetic coils, and which is powered by an external constant voltage source.

11. The fluid pressure measuring device according to claim 1, further comprising means for measuring the frequency of the oscillations of said vibrating member.

* * * * *